Sept. 14, 1965   R. SNYDERMAN   3,206,137
WEB HANDLING APPARATUS
Filed Dec. 31, 1963   4 Sheets-Sheet 1

INVENTOR.
RUBEN SNYDERMAN
BY
ATTORNEY

Sept. 14, 1965        R. SNYDERMAN        3,206,137

WEB HANDLING APPARATUS

Filed Dec. 31, 1963                                          4 Sheets-Sheet 2

United States Patent Office 3,206,137
Patented Sept. 14, 1965

3,206,137
WEB HANDLING APPARATUS
Ruben Snyderman, 732 College Ave., Pittsburgh, Pa.
Filed Dec. 31, 1963, Ser. No. 334,782
2 Claims. (Cl. 242—107.4)

This invention relates to web handling and, in its specific aspects, particularly relates to safety-belt apparatus for vehicles.

Safety belts find their principal use during long trips and it is essential for the comfort of the passenger that the safety belt which is in restraining engagement, with the passenger, shall not grip or hold the passenger tightly. During normal operation of the vehicle the passenger must be capable of moving freely and must not be subjected to the discomfort of a tight band around his body. But this desideratum is in conflict with the demand that when the vehicle is stopped suddenly during a collision or in an attempt to avoid a collision, the belt must grip and hold the passenger firmly.

It is an object of this invention to provide safety-belt apparatus in normal use of which the restrained passenger shall be comfortable but which shall effectively restrain the passenger when the vehicle receives a sudden shock.

Safety-belt apparatus in accordance with the teachings of the prior art includes inertial means which in the normal use of the apparatus, when the belt is unwound slowly, follows the belt and leaves the passenger unrestrained. When the vehicle receives a sudden shock, the inertia means is expected not to follow the belt and the belt is locked against further movement by resulting cam action or the like.

The difficulty with this prior art apparatus is that it lacks reliability and at times fails to function effectively.

It is accordingly an object of this invention to overcome the above described difficulty and to provide safety-belt apparatus which shall operate with the utmost reliability while not militating against the passenger's comfort. A further object of this invention is to provide novel web-handling apparatus having particular applicability to safety-belt operation but also having general applicability to the operation of winding and take-up reels.

This invention arises from the realization that the prior-art safety-belt apparatus lacks reliability because it is not positive in its action and depends on acceleration rather than speed for its operation. It has been realized that where there is substantial friction between the part connected to the belt and the inertial means, or, where the acceleration is insufficient, the locking may fail to be effected because the necessary relative movement fails to occur.

According to this invention safety-belt apparatus is provided which is actuable by centrifugal force dependent on the speed of movement of the belt by the passenger as he is hurled forward by the sudden deceleration of the vehicle. Specifically the safety belt is wound on a roll from which it is partially unwound when restraining the passenger. Movement of the belt around a passenger by forward movement of the passenger rotates the roll. Latch means is provided which is responsive to the centrifugal force produced by this rotation to lock the belt against further unwinding. In accordance with the specific aspects of this invention the sensitivity of this latch means may be improved by interposed speed increasing mechanism between the roll and the part of the latch means responsive to centrifugal force.

In accordance with a further aspect of this invention restoring means may be provided for automatically rewinding the belt when it is released. This restoring means may be latched against rewinding in the normal use of the belt but this holding latch may be released by centrifugal force produced by the rotation of the roll during winding. The above described speed increasing means may serve not only for the latching of the belt when the vehicle suffers a shock but also for releasing the latch for rewinding.

The novel features considered characteristic of this invention are described above. For a better understanding of this invention, both as to its organization and as to its method of operation, together with additional objects and advantages thereof, reference is made to the following description taken in connection with the accompanying drawings, in which.

Figure 2:
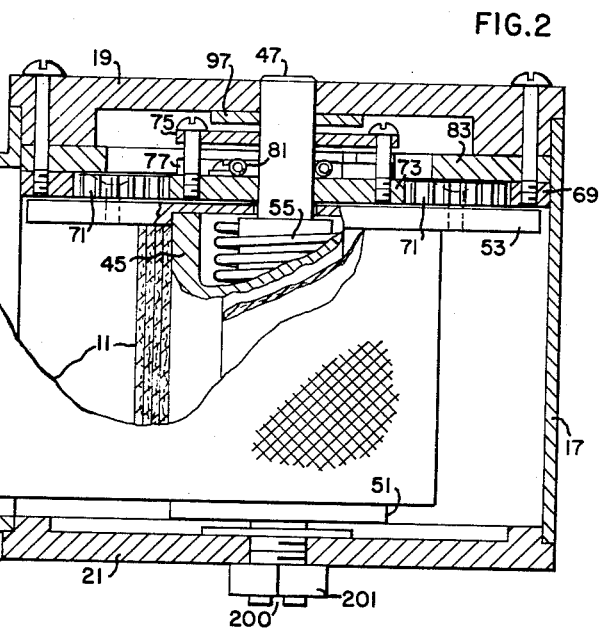
FIG. 2 is a view partly in top elevation and partly in section showing safety-belt apparatus according to this invention.
Figure 3:
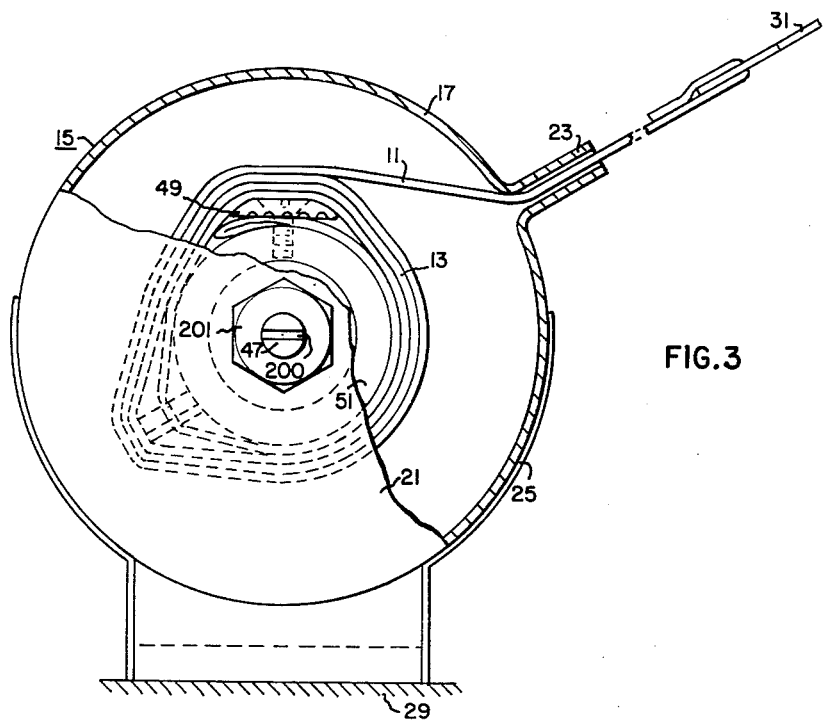
FIG. 3 is a view partly in end elevation and partly in section of this apparatus.

The drawings show safety-belt apparatus including a belt 11 which is wound on a roll 13 (FIGS. 2, 3) in a casing 15. The casing has a cyindrical wall 17 and bases 19 and 21. The ends of the wall 17 terminate in opposite lips 23 which form a slot through which the belt 11 may be unwound.

Figure 1:
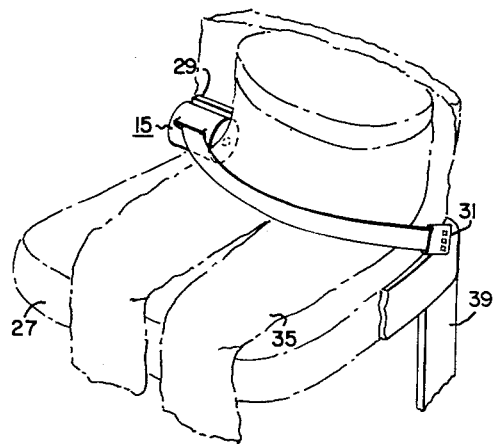
FIGURE 1 is a view in perspective illustrating the manner in which this invention is used.

The cylindrical wall 17 is seated in a saddle 25 which is bolted to a part of the vehicle near the seat 27. As shown in FIG. 1, the saddle 25 is secured to the seat wall 29 on one side of the seat 27. The saddle may also be bolted to the floor of the vehicle or in any other convenient position. A plate 31 or strong plastic, of phenolic condensation product having slots 33 for latching extends from the free end of the belt 11. The plate 31 may be somewhat thicker than the opening in the slot between the lips 23 so that it does not recede into the slot. The plate 31 may be grasped by the passenger 35 and pulled to unwind the belt.

Figure 6:
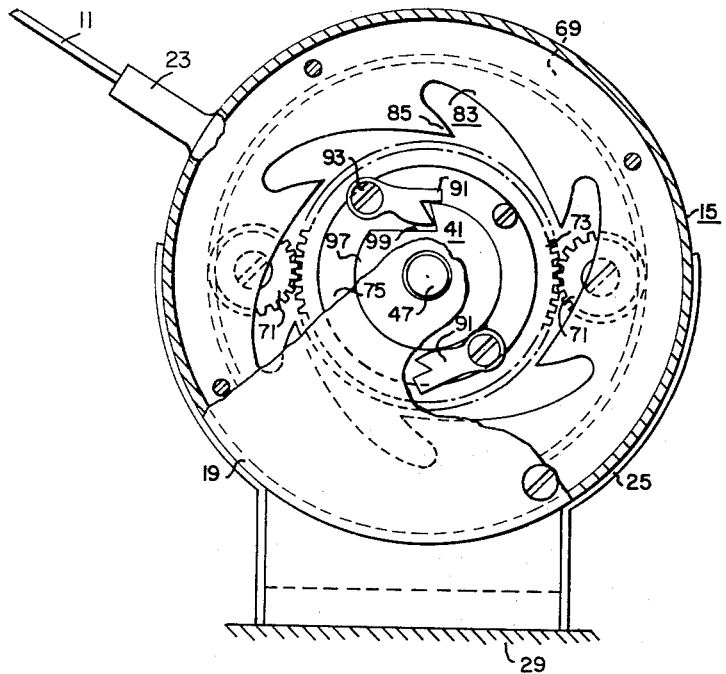
FIG. 6 is a view in end elevation of this apparatus as seen from the same side as the viewpoint of FIGS. 4 and 5 with only the end wall broken away to show the latching mechanism for the restoring means in the locking position.

The belt may be locked in a position restraining the passenger 35 by the usual claw mechanism (not shown) preferably extending from a flat spring 39 on the side of passenger 35 opposite to the panel 29. The passenger 35 may unwind the belt 11 so that he is not uncomfortably restrained by the belt. The belt is held in any unwound position by the latch mechanism 41 (FIG. 6).

Figure 7:
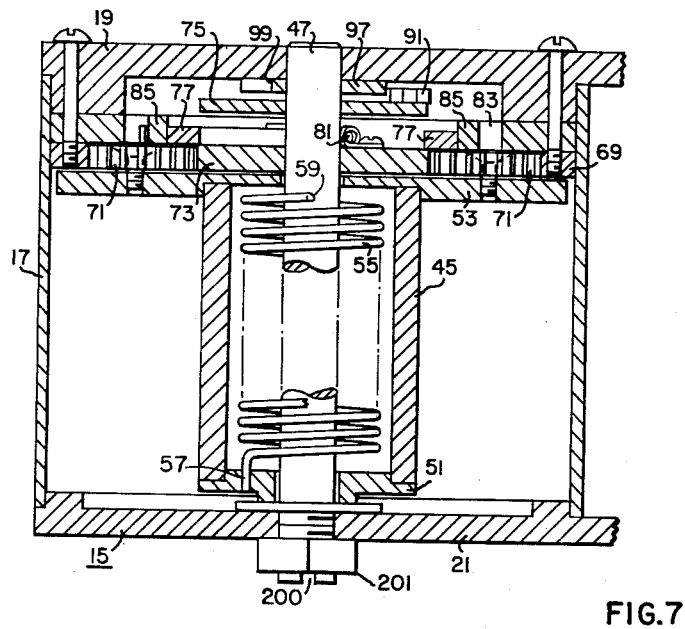
FIG. 7 is a view partly in top elevation and partly in section showing the safety-belt winding and unwinding mechanism.

The roll 13 is wound on a drum 45 which is rotatable about a pin 47 secured between the bases 19 and 21 of the casing 15. The inner end 49 of the belt 11 is secured to the drum 45. The drum 45 has a shouldered base 51 at one end which serves as a rotating bearing on the pin 47. At the other end the drum 45 carries a disc 53 extending substantially to the wall of the casing 15, which also serves as a rotating bearing on the pin 47. Within the drum 45 there is a helical spring 55 which is secured at one end 57 to the base 51 and at the other end 59 (FIG. 7) to the pin 47. When the belt 11 is unwound from the roll 13, the spring 55 is subjected to tension exerting a restoring force in a direction such as to rewind the belt 11. The rewinding of the belt 11 when it is restraining the passenger 35 is prevented by the latching mechanism 41. The tension of the spring 55 may be set by turning the pin 47 by means of the slot 200 and secured by nut 201.

When the vehicle receives a sudden shock, the passenger 35 is restrained by operation of a latching mechanism 65 responsive to the centrifugal force produced by the unwinding of the belt 11 from the roll 13. The centrifugal force applied is enhanced by connecting the roll 13 to the mechanism 65 through a gear train 67.

The gear train 67 includes an internal circumferential gear 69 secured to the base 19, planetary gears 71 in mesh with gear 69, which are mounted on the disc 53 and revolve therewith as roll 13 is wound and unwound, and a central gear 73 meshing with the gears 71 and rotatable on pin 47. The gear 73 is rotatable at a substantially higher speed than the roll 13. The central gear 73 carries with it as it rotates a collared disc 75.

Figure 4:
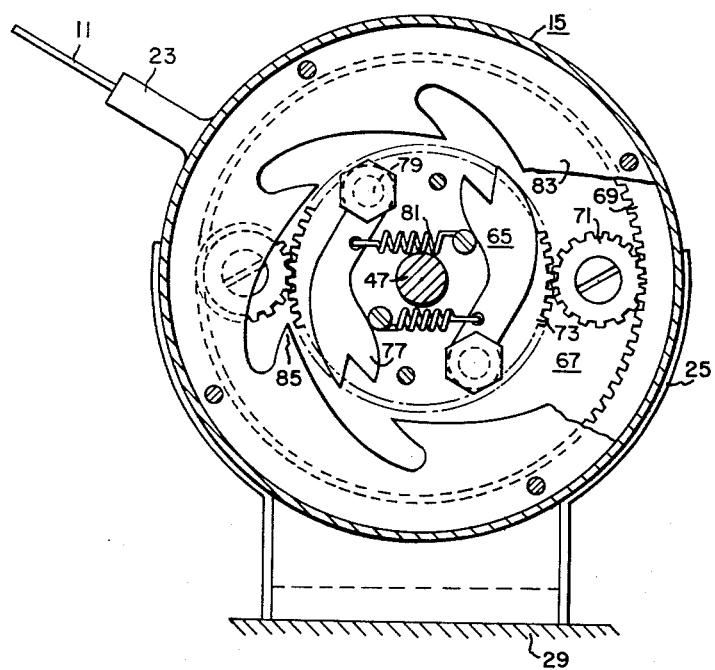
FIG. 4 is a view in end elevation of this apparatus with the end wall and a portion of the end broken away to show the latching mechanism for locking the belt against unwinding in the retracted or non-locking position.
Figure 5:
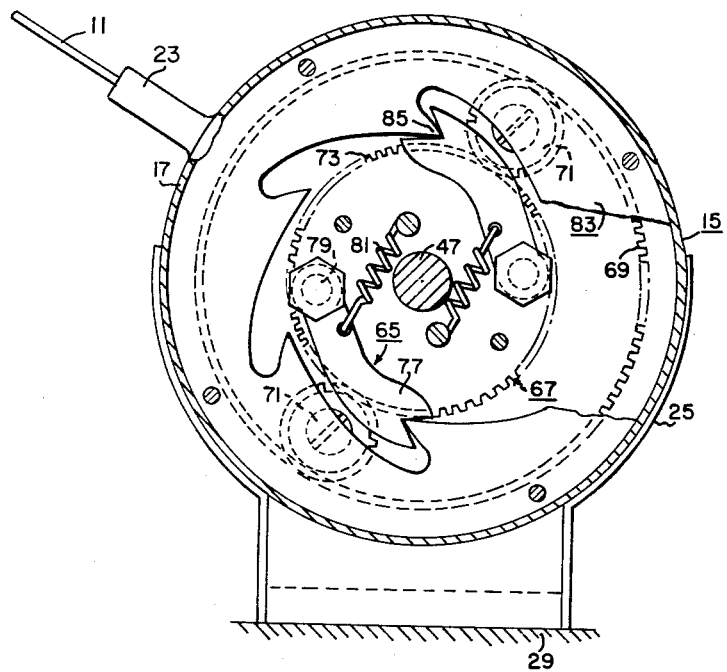
FIG. 5 is a view similar to FIG. 4 showing the latching mechanism in the locked position.

The latching mechanism includes pawls 77 which are pivotally mounted on the central gear 73 on pins 79 so that when the gear 73 rotates centrifugal force is exerted on the pawls to cause them to pivot outwardly against the tensional force of restoring coil springs 81 also mounted on the gear 73. The pawls 77 cooperate with an internally toothed disc 83 which is secured to base 19. Normally the pawls 77 are retracted by the springs 81 (see FIG. 4). Under the action of the centrifugal force which is produced when the gear 73 is rotated at a high speed by the abrupt forces applied to the belt 11 by the passenger 35 when the vehicle is stopped abruptly, the pawls 77 swing outwardly to engage the teeth 85 of the disc 83. The teeth 85 are formed so as to engage the pawls 77 when they are revolved in the unwinding direction of the roll 13; when revolved in the winding direction by the spring 55, the pawls are pivoted outwardly but merely slide over the teeth 85.

The disc 75 carries pawls 91 of the latching mechanism 41 (see FIG. 6). These pawls 91 are pivotally mounted on pins 93 in the disc 75 and are urged inwardly by gravity. The pawls 91 cooperate with a disc 97 which has an external tooth 99.

In any unwound position of belt 11 or in the wound position gravity urges one of the pawls 91 into engagement with the tooth 99. The engaged pawl may be disengaged by pulling the belt 11 outwardly. The tooth 99 is so formed that as the belt is pulled outwardly the pawls 91 ride over the disc 97. When the belt 11 is pulled outwardly in any position and then released, the spring 55 winds the belt 11 on the roll 13 and the centrifugal force produced by rotation of gear 73 on the pawls 91 is such as to urge the pawls 91 outwardly out of the path of the tooth 99 so that the belt is completely wound on roll 13. Thus the mechanism including the gear 73 and the disc 74 serves not only to lock the belt so that the passenger 35 is restrained during a collision but also to hold the belt normally in a position so that the passenger is comfortable.

While a preferred embodiment of this invention has been disclosed herein, many modifications thereof are feasible. This invention then is not to be restricted except insofar as is necessitated by the spirit of the prior art.

I claim as my invention:

1. Web handling apparatus including a web wound in a roll and capable of being unwound from said roll, restoring means connected to said web for rewinding said web on said roll when said web is unwound from said roll, a rotatable member, speed increasing means connected to said roll and to said member for rotating said member responsive to the rotation of said roll, at a substantially higher angular velocity than said roll, first latching means including a first part and a cooperative second part, said second part being revolved by the rotation of said member at the angular velocity of said member and responsive to the centrifugal force exerted on said second part by the rotation of said member, produced by the unwinding of said web at a speed greater than a predetermined magnitude, to cause said first and second parts to enter into latching engagement to prevent further unwinding of said web, and second latching means including a third part and a cooperative fourth part, said fourth part being revolved by the rotation of said member at the angular velocity of said member, said third and fourth parts being in latching relationship with said restoring means to prevent rewinding of said web and said fourth part being responsive to the centrifugal force on said fourth part, produced by the rotation of said member by the rewinding of said web, to cause said third and fourth parts to be disengaged from latching engagement and to permit said restoring means to rewind said web.

2. Web handling apparatus including a web wound in a roll and capable of being unwound from said roll, restoring means connected to said web for rewinding said web on said roll when said web is unwound from said roll, a rotatable member, means connected to said roll and to said member for rotating said member responsive to the rotation of said roll, first latching means including a first part and a cooperative second part, said second part being revolved by the rotation of said member and being responsive to the centrifugal force exerted on said second part by the rotation of said member, produced by the unwinding of said web at a speed greater than a predetermined magnitude, to cause said first and second parts to enter into latching engagement to prevent further unwinding of said web, and second latching means including a third part and a cooperative fourth part, said fourth part being revolved by the rotation of said member, said third and fourth parts being in latching relationship with said restoring means to prevent rewinding of said web and said fourth part being responsive to the centrifugal force on said fourth part, produced by the rotation of said member by the rewinding of said web, to cause said third and fourth parts to be disengaged from latch engagement and to permit said restoring means to rewind said web.

References Cited by the Examiner

UNITED STATES PATENTS

| 779,284 | 1/05 | Johnson et al. | 254—157 |
|---|---|---|---|
| 1,861,221 | 5/32 | Martin et al. | 242—107.7 |
| 1,979,627 | 11/34 | Kozak | 242—107.7 X |
| 2,629,630 | 2/53 | Roark | 242—107.6 X |
| 2,791,397 | 5/57 | Coffman | 254—157 X |
| 2,953,315 | 9/60 | Lautier et al. | 242—107.4 |
| 2,990,131 | 6/61 | Carlsson | 242—107.4 |
| 3,058,687 | 10/62 | Bentley | 242—107.4 |

MERVIN STEIN, *Primary Examiner.*